United States Patent
Oikawa

(10) Patent No.: US 8,525,902 B2
(45) Date of Patent: Sep. 3, 2013

(54) IMAGE CAPTURING APPARATUS AND CONTROL METHOD THEREOF, SYSTEM, AND PROGRAM

(75) Inventor: Ryo Oikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/576,418

(22) Filed: Oct. 9, 2009

(65) Prior Publication Data

US 2010/0103287 A1    Apr. 29, 2010

(30) Foreign Application Priority Data

Oct. 29, 2008   (JP) .................................. 2008-278609

(51) Int. Cl.
*H04N 5/76* (2006.01)
*H04N 5/225* (2006.01)
*H04N 5/77* (2006.01)
*H04N 5/92* (2006.01)

(52) U.S. Cl.
USPC ................ 348/231.2; 348/231.9; 348/231.99; 348/207.1; 386/224; 386/326

(58) Field of Classification Search
USPC .......... 348/231.9, 231.1, 231.2, 231.3, 231.7, 348/231.8, 220.1, 207.1; 386/200, 224, 326; 709/236, 217
See application file for complete search history.

(56) References Cited

U.S. PATENT DOCUMENTS

| 6,901,206 B2 * | 5/2005 | DaSilva ......................... 386/239 |
| 2008/0091830 A1 * | 4/2008 | Koshino et al. ............... 709/227 |
| 2009/0226149 A1 * | 9/2009 | Shibata et al. .................. 386/95 |
| 2009/0276465 A1 * | 11/2009 | Namba et al. ................. 707/200 |

FOREIGN PATENT DOCUMENTS

| JP | 2000-069417 A | 3/2000 |
| JP | 2001-086462 | 3/2001 |
| JP | 2004-328034 | * 11/2004 |
| JP | 2007-174693 A | 7/2007 |

OTHER PUBLICATIONS

The above references were cited in a Dec. 3, 2012 Japanese Office Action, which is enclosed without English Translation, that issued in Japanese Patent Application No. 2008-278609.

* cited by examiner

*Primary Examiner* — Nhan T Tran

(74) *Attorney, Agent, or Firm* — Cowan, Liebowitz & Latman, P.C.

(57) ABSTRACT

An image capturing apparatus which is connectable to and able to communicate with an external control apparatus, comprises an image capturing unit configured to capture an object image and generates image data; a recording unit configured to divide image data generated by the image capturing unit into a plurality of files and records the files; and a notifying unit configured to notify the external control apparatus of individual files divided into the plurality of files and recorded as information of a single file.

20 Claims, 14 Drawing Sheets

F I G. 3
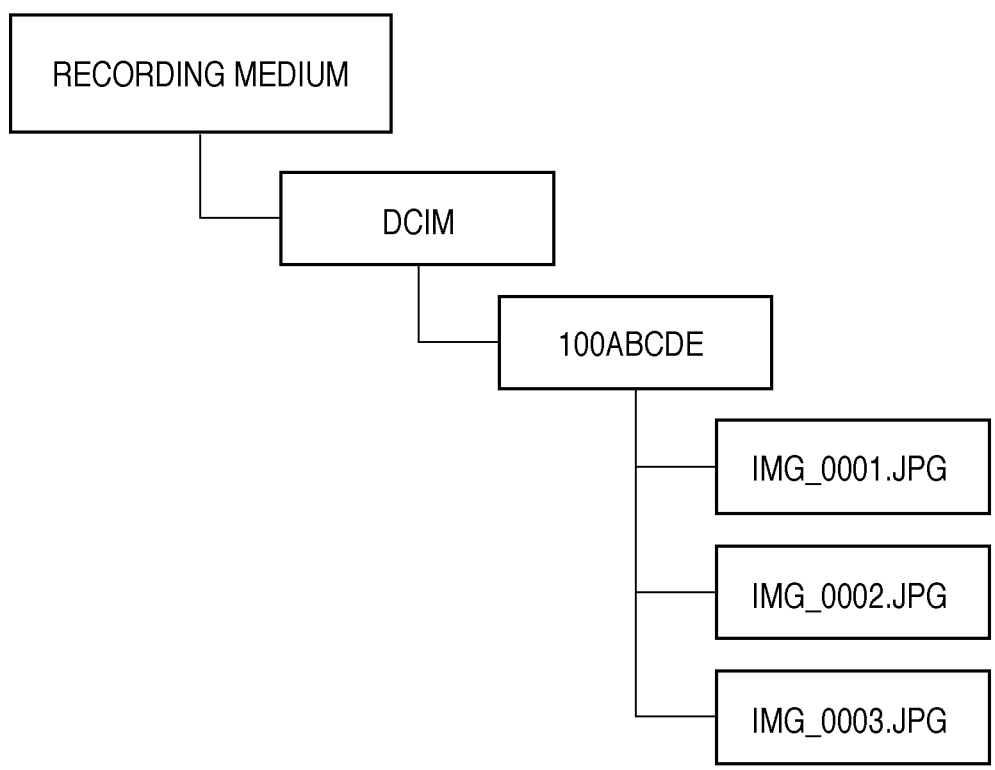

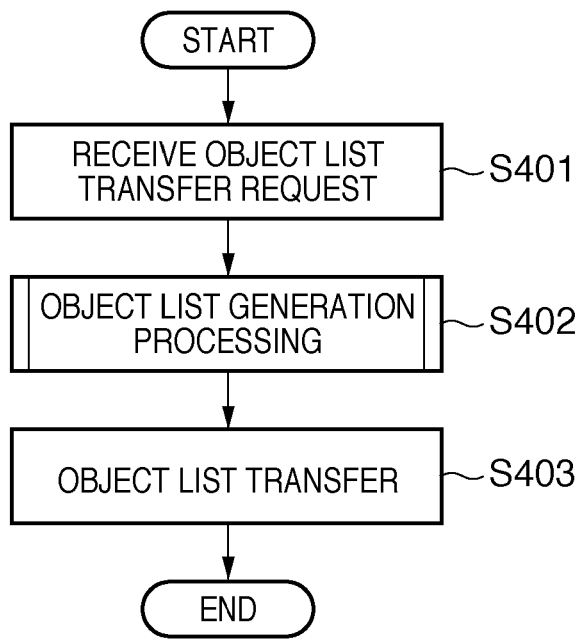
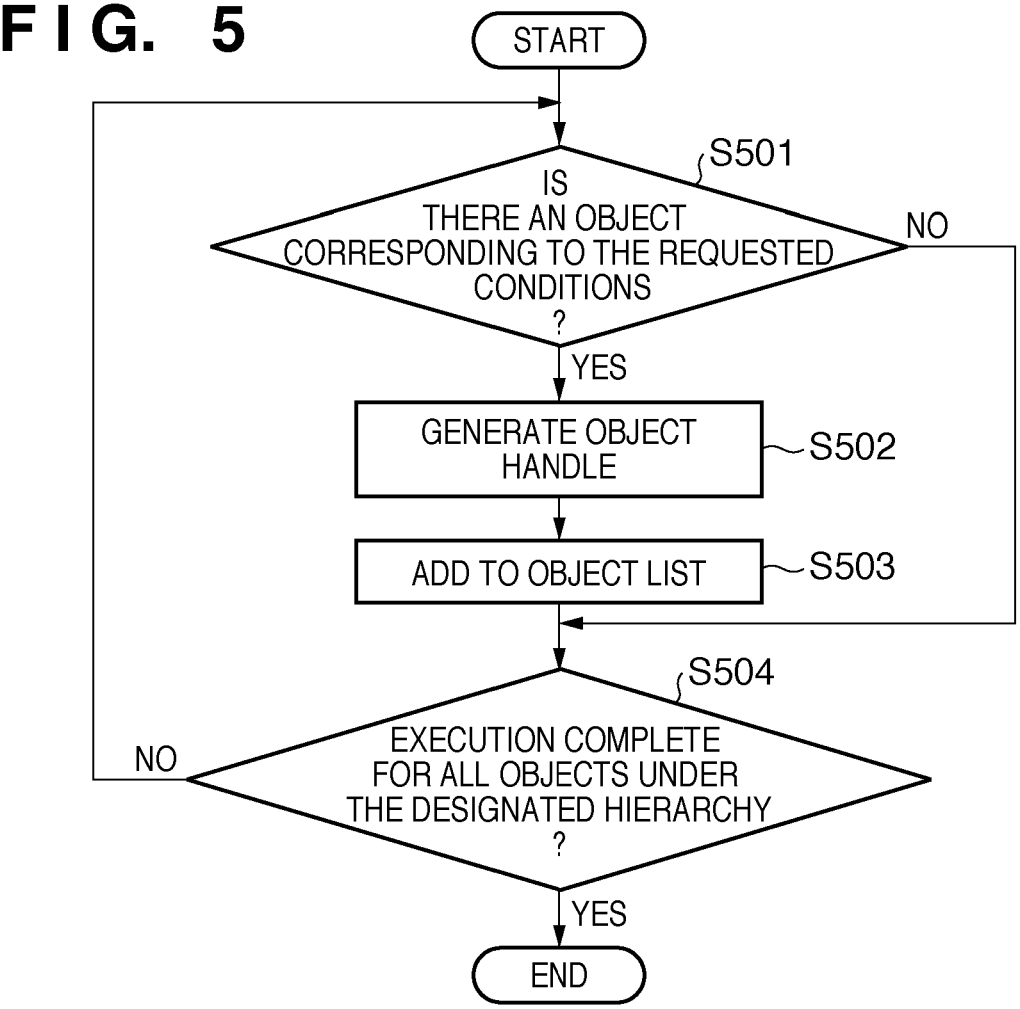

FIG. 8

| |
|---|
| 0x10000000   (DCIM HANDLE) |
| 0x11000000   (100ABCDE HANDLE) |
| 0x11000011   (IMG_0001.JPG HANDLE) |
| 0x11000021   (IMG_0002.JPG HANDLE) |
| 0x11000031   (IMG_0003.JPG HANDLE) |

FIG. 9

NAME : IMG_0001.JPG
ATTRIBUTE : ReadOnly
FILE SIZE : 4Mbyte
CREATED DATE AND TIME : 2007/01/01
FILE FORMAT : JPEG
....

F I G. 10
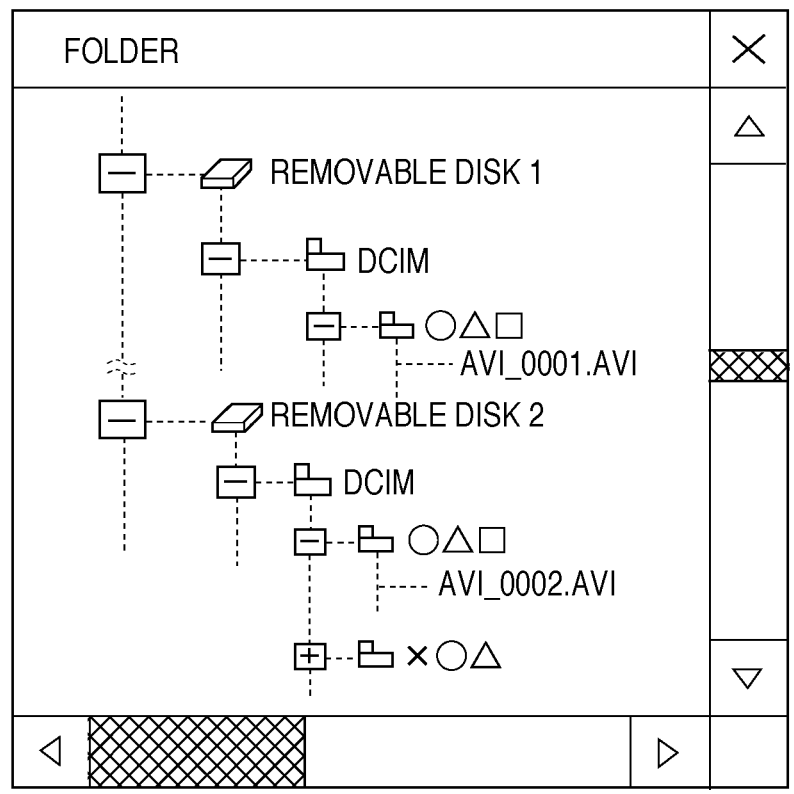

IMAGE CAPTURING APPARATUS AND CONTROL METHOD THEREOF, SYSTEM, AND PROGRAM

BACKGROUND OF THE INVENTION

1. Field of the Invention

The present invention relates to technology to transfer data between an external control apparatus and an image capturing apparatus.

2. Description of the Related Art

Image capturing apparatuses such as a digital camera or digital video camera that record a still image, audio, and a moving image on a recording medium generally use a small memory that is detachable from the camera such as a CF (compact flash (TM)) or an SD card, etc.

Also, some image capturing apparatuses have two or more recording media, and a user can freely switch the destination recording medium and record a file of a captured image data. There are also image capturing apparatuses that can capture an image without the need for the user to be conscious of the remaining capacity of the recording medium designated to be the recording destination, by automatically switching the recording destination of a captured image data file to another recording medium loaded into the image capturing apparatus, in the case that the capacity of the destination recording medium is insufficient.

Also, when a moving image is captured and recorded, there is a method of storing the captured moving image data in a flash memory loaded into the image capturing apparatus, and recording it on a recording medium connected to the image capturing apparatus from the flash memory after image capturing is complete. However, because the upper limit of the size of the moving image data that can be recorded using this method is restricted by the upper limit of the capacity of the flash memory loaded into the image capturing apparatus, a large number of image capturing apparatuses adopt a method that executes image capturing while sequentially recording captured moving image data in the recording medium.

For an image capturing apparatus that automatically switches the recording medium of the recording destination in the aforementioned manner in the case that the capacity of the recording medium is insufficient, technology in which the recording medium from which moving image data is to be read out is automatically switched to during playback, and in which playback is continuously executed has been proposed (for example, refer to Japanese Patent Laid-Open 2001-086462).

On the other hand, there is a method in which an image capturing apparatus is connected to a computer by a cable such as a USB (Universal Serial Bus) or IEEE 1394, and an image file captured by the image capturing apparatus is transferred to the computer (or to a digital device that has a recording medium). There is also a method in which the recording medium is disconnected from the camera main body and connected to a computer, and information is loaded in from the recording medium as an external recording apparatus of the computer.

According to the aforementioned Japanese Patent Laid-Open 2001-086462, it is possible to divide image data and record it in a plurality of recording media. However, transfer to a computer of image data divided into a plurality is not considered. In the technology disclosed in Japanese Patent Laid-Open 2001-086462, there are a plurality of files in a recording medium of an image capturing apparatus for divided image data, and these plurality of files are transferred as-is to a computer. Therefore, operation is troublesome because the files must be handled as individual files even if the user is aware that each image file browsed on a computer is part of a file of a sequence of captured images.

SUMMARY OF THE INVENTION

In order to solve the aforementioned problems, the present invention provides an image capturing apparatus which is connectable to and able to communicate with an external control apparatus, comprising: an image capturing unit configured to capture an object image and generates image data; a recording unit configured to divide image data generated by the image capturing unit into a plurality of files and records the files; and a notifying unit configured to notify the external control apparatus of individual files divided into the plurality of files and recorded as information of a single file.

The present invention also provides a control method for an image capturing apparatus comprising a communication unit configured to connect to and communicate with an external control apparatus, and an image capturing unit configured to capture an object image and generate image data, comprising: a recording step of recording image data generated by the image capturing unit and dividing the image data into a plurality of files and recording the files; and a notifying step of notifying the external control apparatus of individual files divided into the plurality of files and recorded as information of a single file.

The present invention also provides a system in which an external control apparatus and an image capturing apparatus are connectable and able to communicate, wherein: the image capturing apparatus comprises: an image capturing unit configured to capture an object image and generates image data; a recording unit configured to divide image data generated by the image capturing unit into a plurality of files and records the files; and a notifying unit configured to notify the external control apparatus of individual files divided and recorded in the plurality of files as information of a single file; and the external control apparatus comprises: a receiving unit configured to receive file information for which notification was given by the image capturing apparatus; and an obtaining unit configured to obtain image data divided into a plurality of files from the image capturing apparatus as a single file, based on file information for which notification was given by the receiving unit.

According to the present invention, a user can easily execute an operation to search or playback a divided file on an external device.

Further features of the present invention will be apparent from the following description of exemplary embodiments (with reference to the attached drawings).

BRIEF DESCRIPTION OF THE DRAWINGS

FIG. 3 is a diagram exemplifying a file recorded in a recording medium and the hierarchical structure of a folder.

FIG. 4 is a flowchart illustrating object list transfer processing.

FIG. 5 is a flowchart illustrating object list creation processing.

FIG. 8 is a diagram exemplifying an object list.

FIG. 9 is a diagram exemplifying object information.

FIG. 10 is a diagram illustrating an example of a list display of object data.

DESCRIPTION OF THE EMBODIMENTS

Hereinafter, an embodiment to implement the present invention will be explained in detail with reference to the attached drawings. Moreover, the hereinafter explained embodiment is only one example of implementation of the present invention, and may be arbitrarily modified or changed depending on the structure of the device or any type of conditions to which the present invention is applied, and the present invention is not limited by the embodiment below.

Figure 1:
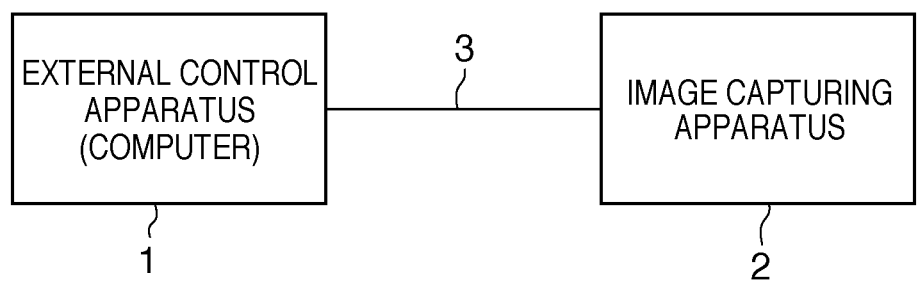
FIG. 1 is a diagram illustrating a system in which an image capturing apparatus and external control apparatus are connected so as to allow communication according to an embodiment of the present invention.

FIG. 1 is a diagram illustrating a system in which an image capturing apparatus and external control apparatus are connected so as to allow communication according to an embodiment of the present invention.

An external control apparatus (computer) 1 and image capturing apparatus 2 are connected by a USB cable 3 through a communication unit. File data information in the image capturing apparatus 2 can be browsed as a hierarchical structure of folders and files from the external control apparatus 1 through the USB cable 3, and desired file information can be arbitrarily selected from the browsed file information.

Although a USB cable 3 is exemplified as a medium to connect the external control apparatus 1 and image capturing apparatus 2 in the present embodiment, there is no limit to this, and IEEE 1394 or the like is possible in the case of a wire, and a wireless connection is also possible.

Figure 2:
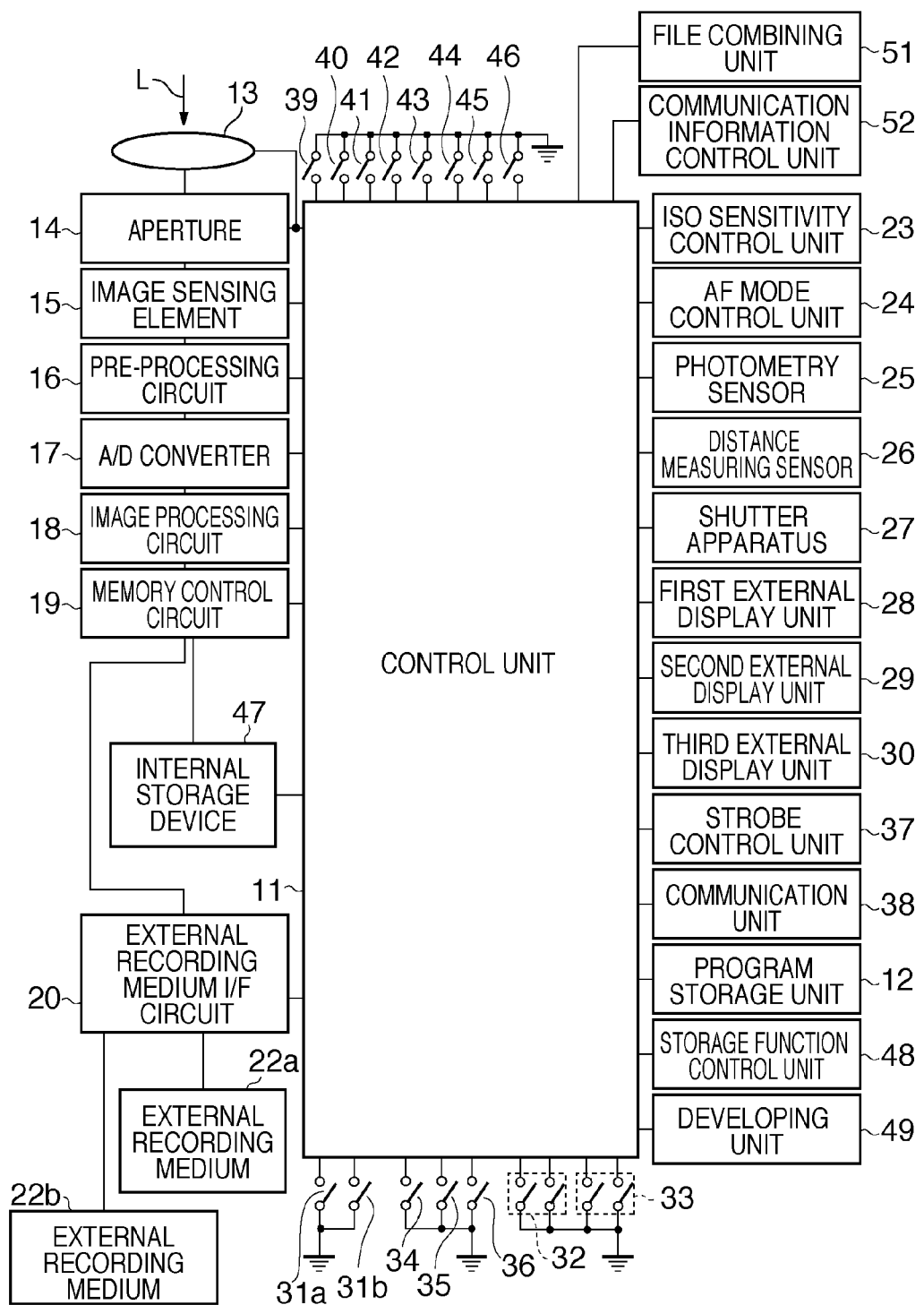
FIG. 2 is a block diagram illustrating the structure of the image capturing apparatus according to the present embodiment.

FIG. 2 is a block diagram illustrating the structure of the image capturing apparatus according to the present embodiment.

In FIG. 2, a control unit 11 controls the entire operation of the image capturing unit 2 according to a program stored in advance in a program storage unit 12.

A ray of light L from an object passes through an image capturing lens 13 and an aperture 14 and is received by an image capturing element 15. The image capturing element 15 is an element that converts the received light to an electric signal, and is composed of individual image capturing elements that are charge coupled devices (CCD), CMOS devices, or the like. Reference numeral 16 is a pre-processing circuit, and provides a non-linear type amplifier circuit that executes before a CDS circuit or A/D converter to eliminate output noise from the image capturing element 15.

Reference numeral 17 is an A/D converter that converts an analog signal output from the pre-processing circuit to a digital signal. The image signal converted to a digital signal by the A/D converter 17 is output to an image processing circuit 18, image processing such as contour compensation, gamma compensation, white balance compensation, etc., is executed, and it is then output to a memory control circuit 19.

The memory control circuit 19 passes the image signal generated in the image processing circuit 18 through an external recording medium I/F circuit 20, and records it in an external recording medium 22a, 22b such as a memory card or the like that is detachable from the image capturing apparatus 2. An internal storage device 47 stores temporary internal data such as the aforementioned white balance correction value, etc.

Reference numeral 23 is an ISO sensitivity control apparatus, and executes control of the sensor sensitivity of the image capturing element 15 in accordance with an ISO sensitivity set in advance.

An aperture 14 is controlled by the control unit 11 in accordance with an output from a photometry sensor 25 that measures the luminosity of the object. An arbitrary aperture value may also be set by user operation. A distance measuring sensor 26 is comprised of a publicly known line sensor such as a CCD or CMOS, etc., corresponding to a distance measurement point, and outputs a measuring point deviation signal corresponding to the distance to the object to the control unit 11.

A shutter apparatus 27 controls the opening time of a shutter to allow the image capturing element 15 to receive light from the object image. The control unit 11 calculates the amount of exposure and determines the shutter speed and aperture value based on each type of input signal, and drive-controls a shutter apparatus 27.

An AF mode control unit 24 controls a mode to automatically determine a focus point, and executes control of manual focus, one-shot auto focus, AI auto focus, AI servo auto focus, etc.

A strobe control unit 37 executes control of an internal strobe or externally attached strobe, and automatically causes strobe emission in the case of underexposure at a setting value set in the aperture 14 and shutter apparatus 27, and controls strobe operation by the user operation.

A first external display unit 28 is a liquid crystal element that mainly displays each type of setting relating predominantly to image capturing such as exposure control and the number of images that can be captured, etc. A second external display unit 29 is a liquid crystal element that mainly displays each type of setting information relating predominantly to image processing. A third external display unit 30 is a color liquid crystal element that can display information relating to a captured image obtained from the image capturing element 15, and further the detailed state of each type of setting or the like of the image capturing apparatus.

Reference numeral 31a is an image capturing preparation switch SW1, and reference numeral 31b is an image capturing switch SW2. Reference numeral 32 is a first information input unit that is used to input each type of image capturing setting information, as well as to input information of an image in a horizontal direction of an image played back during normal playback. Reference numeral 33 is a second input unit that is used to input each type of image capturing setting information, as well as to input information of the image in a vertical direction of an image played back during normal playback. Reference numerals 34, 35 and 36 are mode setting units for setting each type of image capturing setting mode, and reference numeral 34 is an image capturing mode selection button, 35 is an AF mode selection button, and reference numeral 36 is a photometry mode selection button.

A communication unit 38 is a serial port for making a physical connection with a recording medium on the receiving side, and executes file data transmission with the external control apparatus 1, remote image capturing control from the external control apparatus 1 to the image capturing apparatus 2, etc., through the serial port. Although the communication unit 38 has a line connection in the present embodiment, the connection with the external control apparatus 1 may be another line connection, or an I/F that makes a wireless connection.

Reference numerals 39 to 46 are setting selection units for executing each type of setting and selection, and are used to execute each type of setting and selection relating to image capturing functions or file transfer processing corresponding to the third external display unit 30. Reference numeral 39 is a menu button, and is used when a setting menu of the image capturing apparatus is displayed on the third external display unit 30. Reference numeral 40 is a select button, and is used for each type of selection operation when a setting menu of the image capturing apparatus 2 is displayed on the third external display unit 30 by pressing the menu button 39. Reference numeral 41 is a cancel button, and is used to cancel each type of setting. Reference numeral 42 is an Info button, and is used to display detailed file information. Reference numeral 43 is a file deletion button. Reference numeral 44 is an image playback button, and displays image data read out from the external recording medium 22a or 22b on the third external display unit 30. Reference numeral 45 is a rotation button, and re-displays on the third external display unit 30 image data displayed on the third external display unit 30 by the image playback button 44 after rotating it by the image processing circuit 18, and records it in the external recording medium 22a or 22b.

Reference numeral 46 is a communication mode switching unit, and switches the communication mode with the external control apparatus 1 connected to the image capturing apparatus 2 through the communication unit 38.

Reference numeral 48 is a storage function control unit, and executes input/output control of files and folders with the external control apparatus 1 connected to the image capturing apparatus 2 through the communication unit 38.

Reference numeral 49 is a developing unit, and converts a RAW format file representing an image signal input from the image capturing element 15 to a JPEG format file.

A file combining unit 51 converts file data divided into a plurality of files and combines them into a single file. A communication information control unit 52 manages file information combined by the file combining unit 51, and creates data to be sent from the image capturing apparatus 2 to the external control apparatus 1.

Here, an operation to transmit file and folder data between the image capturing apparatus 2 and external control apparatus 1 through the USB cable 3 by the communication unit 38 will be explained.

Data dedicated to communication in the present embodiment conforms to a data signal format set forth by PTP (Picture Transfer Protocol), and is controlled by the storage function control unit 48 and communication information control unit 52.

Moreover, the hardware structure described above relates to an embodiment of the present invention, and is not necessary limited to the aforementioned hardware structure. For example, a single piece of hardware my execute control of the image capturing apparatus, or the entirety of the image capturing apparatus may be controlled by a plurality of pieces of hardware that have partial roles in the control.

<Basic Data Transfer Processing>

First, the basic procedure for executing data transfer by PTP in the case that a file and folder with the hierarchical structure shown in FIG. 3 is recorded in the external recording medium 22a or 22b of the image capturing apparatus 2 will be explained with reference to the flowcharts in FIG. 4 to FIG. 7.

In FIG. 4, firstly, the external control apparatus 1 sends to the image capturing apparatus 2 a transfer request for an object list necessary for selection/designation of a file and folder (hereinafter, object) stored in the external recording media 22a, 22b of the image capturing apparatus 2. The object list can designate all objects recorded in the external recording media 22a, 22b of the image capturing apparatus 2, and a folder can be designated and a handle list of objects that exist in the hierarchy below that folder can be requested. Furthermore, all file formats can be designated, and it is also possible to designate a desired file format such as JPEG or AVI and request an object list matching that condition.

With respect to this, when the image capturing apparatus 2 receives an object list transfer request from the external control apparatus 1 (S401), an object list is generated (S402), and is transferred to the external control apparatus 1 (S403).

FIG. 5 is a flowchart illustrating the object list generating processing of S402.

In FIG. 5, the image capturing apparatus 2 determines for all objects below the hierarchy designated by the object list transfer request whether there is an object that matches the file format such as JPEG or AVI, etc., in step S501. If there is a corresponding object, the storage function control unit 48 generates an object handle that can uniquely discriminate the object (S502). Furthermore, the storage function control unit 48 adds the generated object handle to the object list to be sent to the external control apparatus 1 (S503), and this object list generating processing is repeatedly executed for all objects below the designated hierarchy (S504).

FIG. 8 exemplifies an object list generated by the image capturing apparatus 2 in response to an object list transfer request received from the external control apparatus 1. For example, the object handle 0x11000011 represents IMG_0001.JPG in FIG. 8, and this object handle is designated to execute a transfer request for file information and data for IMG_0001.JPG.

Figure 6:
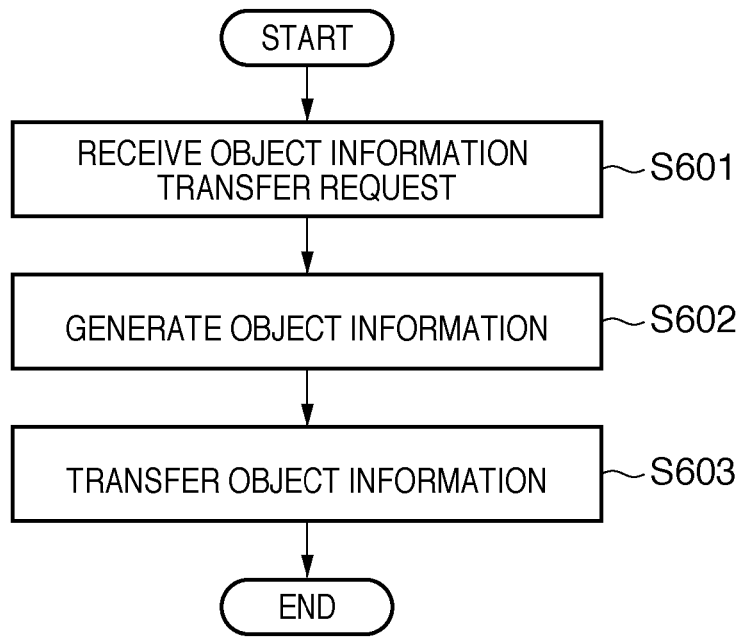
FIG. 6 is a flowchart illustrating object information transfer processing.

FIG. 6 is a flowchart illustrating an operation that obtains detailed object information using the object list obtained from the image capturing apparatus 2.

In FIG. 6, firstly, the external control apparatus 1 ends a transfer request for object information corresponding to a desired object handle designated by the object list obtained from the image capturing apparatus 2.

In response to this, when the image capturing apparatus 2 receives an object transfer request from the external control apparatus 1 (S601), the object representing the object handle is read out from the external recording media 22a, 22b. Then, the storage function control unit 48 generates object information (S602). The object information generated here is a file name, attribute, file size, created date and time of file, file format, etc., as shown in FIG. 9.

The object information generated in S602 is sent to the external control apparatus 1 by the communication unit 38 (S603).

Figure 15:
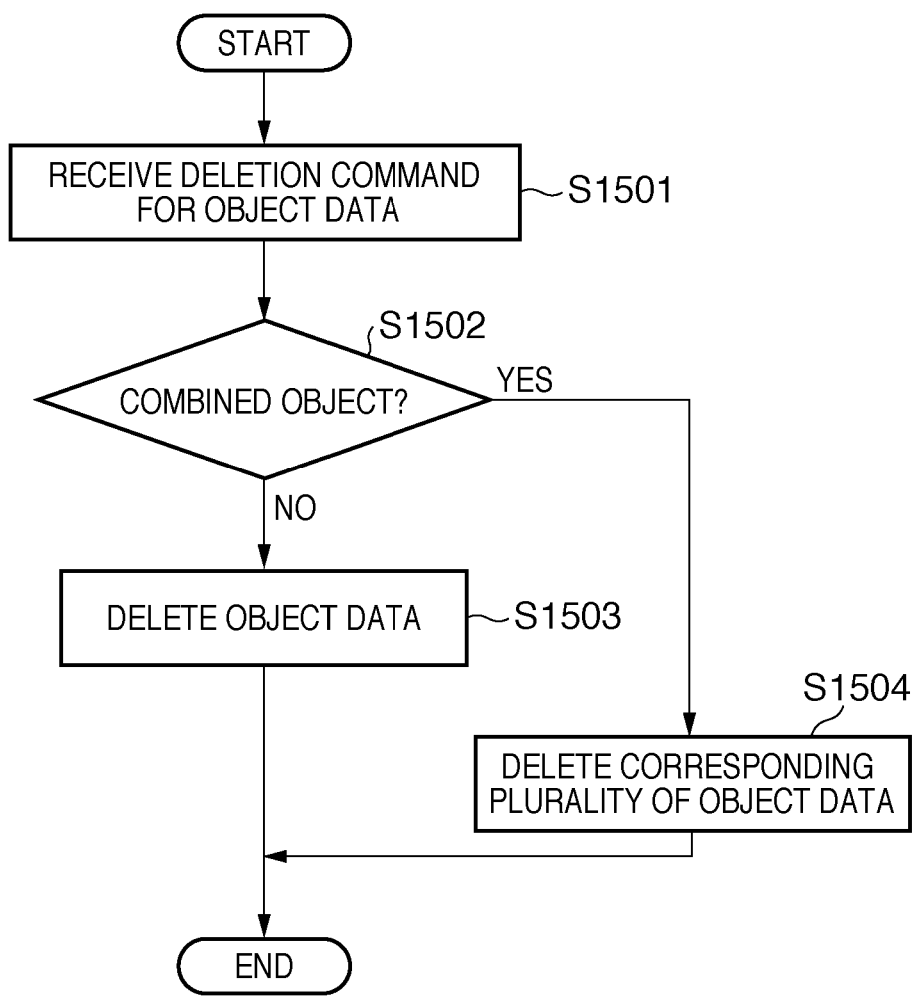
FIG. 15 is a flowchart illustrating object data deletion processing
Figure 16:
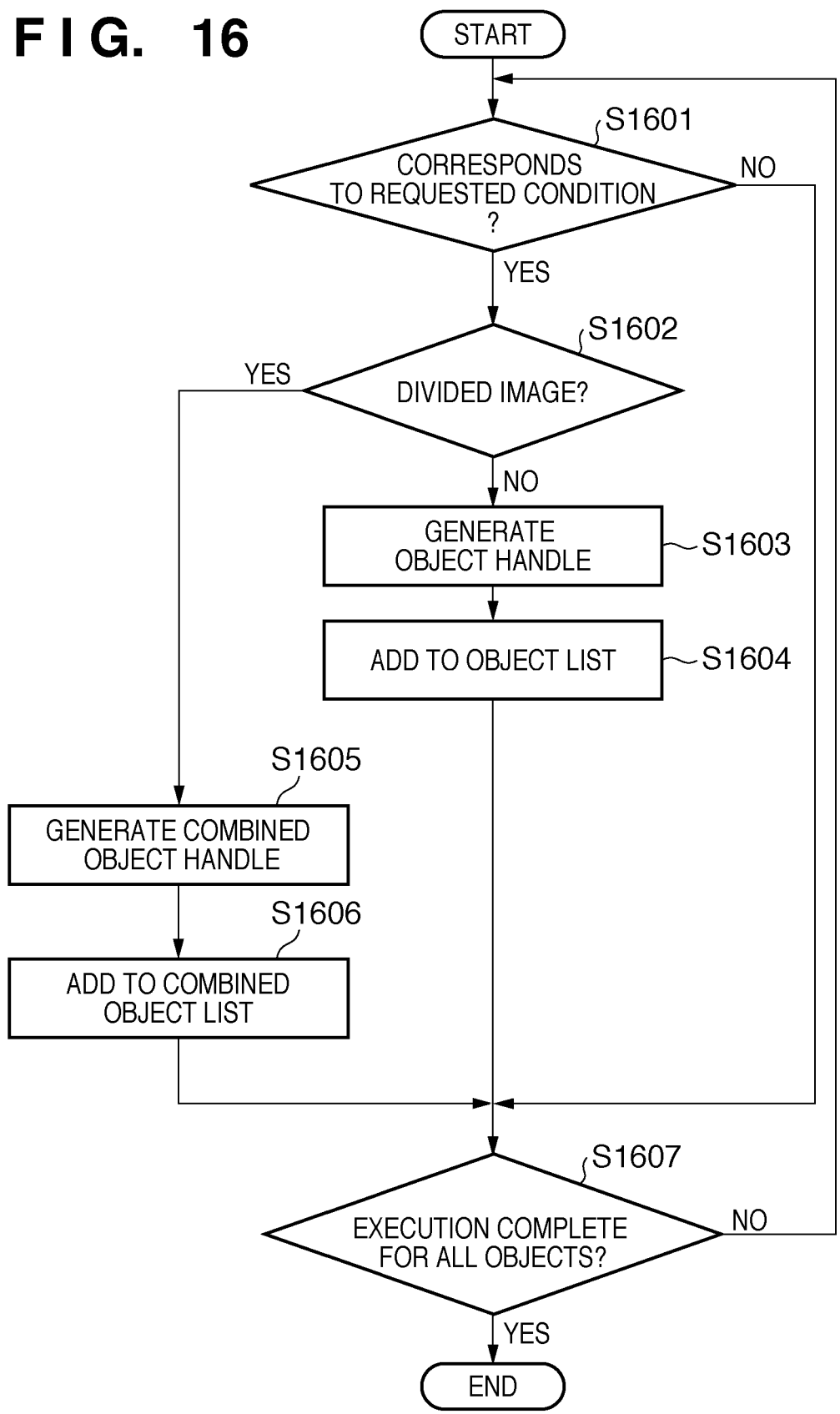
FIG. 16 is a flowchart illustrating combined object list creation processing.
Figure 17:
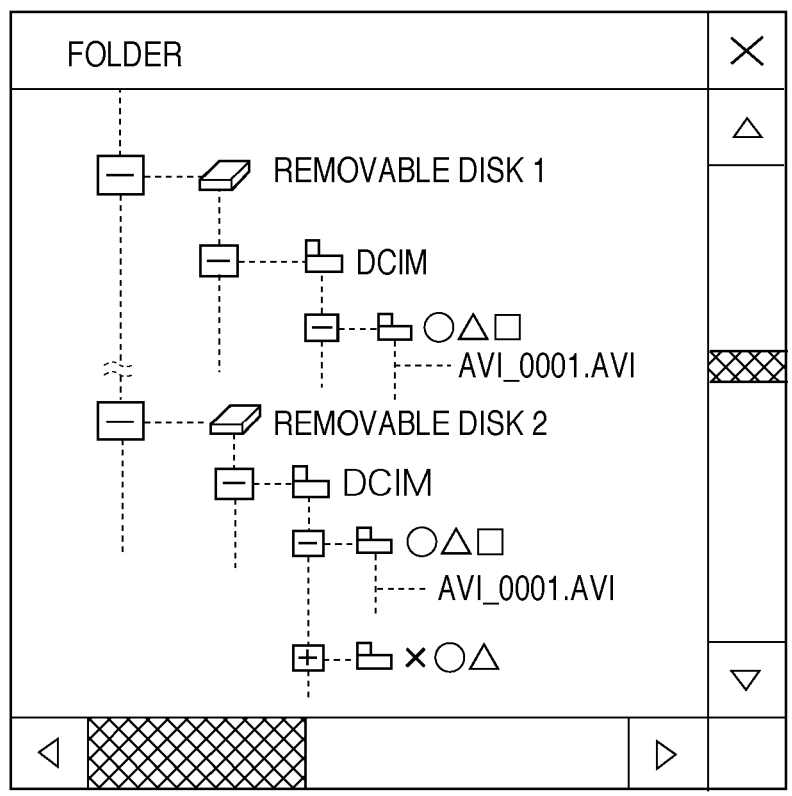
FIG. 17 is a diagram illustrating an example of a list display of combined object data.

In the external control apparatus 1, object information recorded in the external recording media 22a, 22b of the image capturing apparatus 2 can be presented using a file name or icon, etc., based on the object information obtained from the image capturing apparatus 2 (refer to FIG. 15 to FIG. 17).

Figure 7:
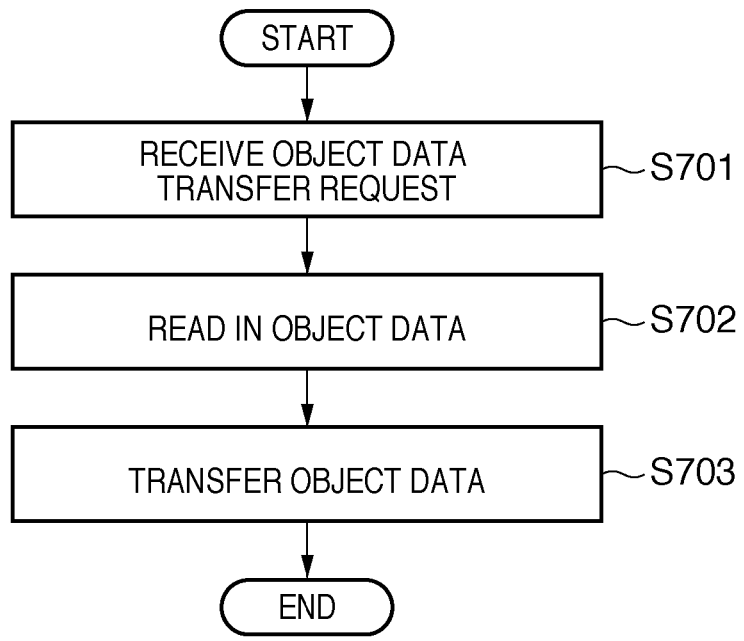
FIG. 7 is a flowchart illustrating object data transfer processing.

FIG. 7 is a flowchart illustrating an operation of obtaining object data from the image capturing apparatus 2.

The operation assumed here is, for example, an operation of a user dragging and dropping an icon representing an object handle displayed on a display or the like of the external control apparatus 1 onto a desktop.

When the aforementioned operation is executed, a transfer request of the object data representing the object handle is sent from the external control apparatus 1 to the image capturing apparatus 2 (S701).

When the image capturing apparatus 2 receives an object data transfer request from the external control apparatus 1, the designated object data is read out from the external recording media 22*a*, 22*b* (S702), and is sent to the external control apparatus 1 through the communication unit 38 (S703).

In the external control apparatus 1, the object data received from the image capturing apparatus 2 is recorded in an auxiliary storage apparatus such as a hard disk or the like of the external control apparatus 1.

In the external control apparatus 1, the object data recorded in the external recording media 22*a*, 22*b* of the image capturing apparatus 2 can be displayed as a file name or file size, created date and time, icon, etc., and presented to the user. For example, as shown in FIG. 10, the two files AVI__0001.AVI and AVI__0002.AVI are displayed on the display or the like of the external control apparatus 1.

<Transfer Processing 1 of Data Divided and Stored in a Plurality of Recording Media>

Here, the basic processing flow using PTP has been explained. Next, a case in which moving image data captured by the image capturing apparatus 2 is divided and recorded in a plurality of recording media will be explained.

An object image is projected through the image capturing lens 13, the amount of light is regulated by the aperture 14, and the image capturing element 15 receives the light and converts it to an electric signal. CDS processing and non-linear amplification processing is executed on the electric signal converted by the image capturing element 15 every specific period by the pre-processing circuit 16 in order to eliminate output noise. The analog signal output from the pre-processing circuit 16 is converted to a digital signal by the A/D converter 17, the digital image signal is output to an image processing circuit 18, image processing such as contour compensation, gamma correction, white balance correction, etc., is performed, and the digital image signal is output to the memory control circuit 19.

The image signal generated by the image processing circuit 18 is converted to a format of a predetermined file format by the storage function control unit 48, and it is then recorded through the external recording medium I/F circuit 20 in an external recording medium 22*a* or 22*b* designated as the recording destination of the image capturing apparatus 2.

Since processing to record the image data file in the external recording medium and processing to capture an object image are executed in parallel, a moving image is captured while being recorded to the external recording medium in the image capturing apparatus 2.

The storage function control unit 48 determines whether the capacity of the recordable data area in the external recording medium 22*a* or 22*b* designated as the recording destination of the image capturing apparatus 2 has been exhausted or is insufficient. Then, if the storage function control unit 48 determines that the capacity of the external recording medium 22*a* designated as the recording destination has been exhausted, the external recording medium I/F circuit 20 is controlled so as to switch the recording destination to the other external recording medium 22*b*, and the moving image file is recorded.

Specifically, as shown in FIG. 10, AVI__0001.AVI is recorded in the external recording medium 22*a* in the image capturing apparatus 2. Also, AVI__0002.AVI is recorded in the external recording medium 22*b* as a continuation moving image file of AVI__0001.AVI recorded in the external recording medium 22*a*.

Next, processing that transfers a moving image file divided and recorded in the external recording media 22*a*, 22*b* from the image capturing apparatus 2 to the external control apparatus 1 according to the present embodiment will be explained with reference to FIG. 11 to FIG. 13.

Hereinafter, a case in which AVI__0001.AVI and AVI__0002.AVI are divided and recorded in the external recording media 22*a*, 22*b*, as shown in FIG. 10, and the image capturing apparatus 2 receives an object list transfer request for all AVI formats from the external control apparatus 1 will be explained.

Figure 11:
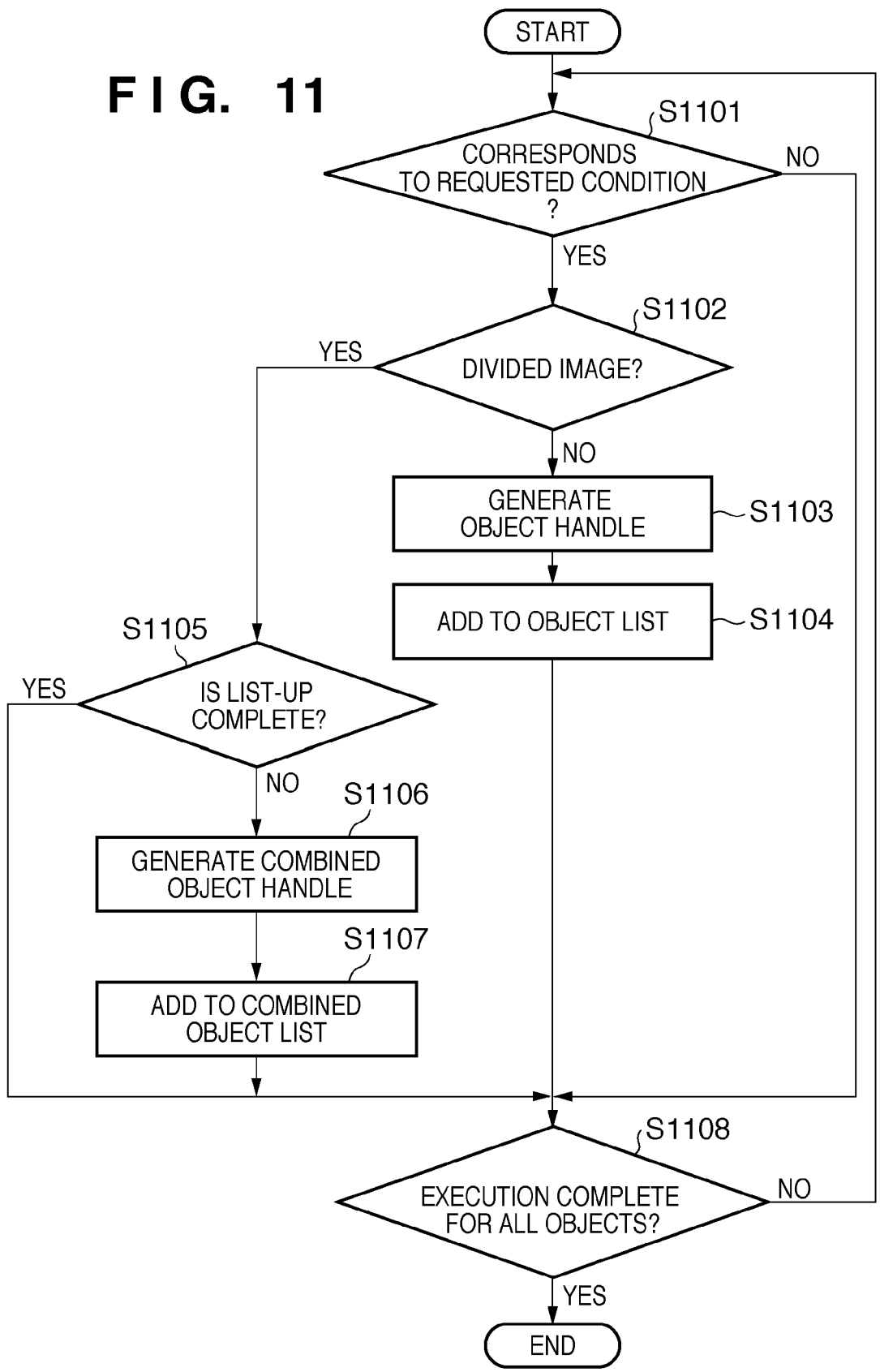
FIG. 11 is a flowchart illustrating combined object list creation processing.

In S401 in FIG. 4, when an object list transfer request is received from the external control apparatus 1, the storage function control unit 48 executes the object list generation processing shown in FIG. 11.

FIG. 11 is a flowchart illustrating the object list generation processing of S402 in FIG. 4.

In FIG. 11, in S1101 the storage function control unit 48 determines whether or not an object currently being analyzed matches the object of the AVI format requested in S401 in FIG. 4, and in the case that it does not match the process proceeds to analysis processing of the next object. On the other hand, in the case that they do match, the storage function control unit 48 determines whether or not the moving image file has been divided and recorded in a plurality of recording media (S1102).

Here, the determination method of whether or not a moving image file has been divided and recorded in a plurality of recording media will be explained. Several methods can be conceived. For example, there is a method wherein which file and which file are the files generated when the moving image data was divided is maintained in the camera memory or in a management file. The storage function control unit 48 can execute the determination of S1102 by referring to this information. Also, a method in which a flag is attached to both of the file data is also possible. The storage function control unit 48 can execute the determination of S1102 by referring to this flag. In this case, not only a flag but identification information of the other file may also be attached. Also, a method in which a file name is created in order to identify it as a divided file when a divided file is generated is also possible. For example, a file stored in a card 1 may be named "AV__0001.AVI", and a file stored in a card 2 may be named "VI__0001.AVI". The storage function control unit 48 can execute the determination of S1102 by referring to the file name.

In the case that the moving image file is not divided and recorded in a plurality of recording media in S1102, the process proceeds to S1103, and the storage function control unit 48 generates an object handle that can uniquely discriminate the designated object. Then, the storage function control unit 48 adds the generated object handle to the object list to be transferred to the external control apparatus 1 (S1104), and the process proceeds to analysis processing of the next object.

On the other hand, in the case that the moving image file has been divided and recorded in a plurality of recording media, the process proceeds to S1105, and the storage function control unit 48 determines whether or not all handles of the individual objects divided and recorded in the plurality of recording media have been added to the list. In the case that they have already been added to the handle list, the process proceeds to analysis processing of the next object.

Also, in the case that not all have been added to the list in S1105, the storage function control unit 48 combines individual files that have been divided and recorded, and generates an object handle that represents the moving image file after the combination (S1106). Here, the storage function control unit 48 may generate an object handle for a combined file object with a naming statute that allows discrimination from an object of a file that has not been combined.

In S1107, the storage function control unit 48 adds the combined object handle generated in S1106 to the object list (S1107), and this object list generation processing is repeatedly executed for all objects (S1108).

In the present embodiment, AVI_0001.AVI and AVI_0002.AVI are divided and recorded in the external recording media 22a, 22b. Therefore, these are combined, and the handle 0x10000000 shown in FIG. 8, for example, is sent to the external control apparatus 1 as an object list.

Figure 12:
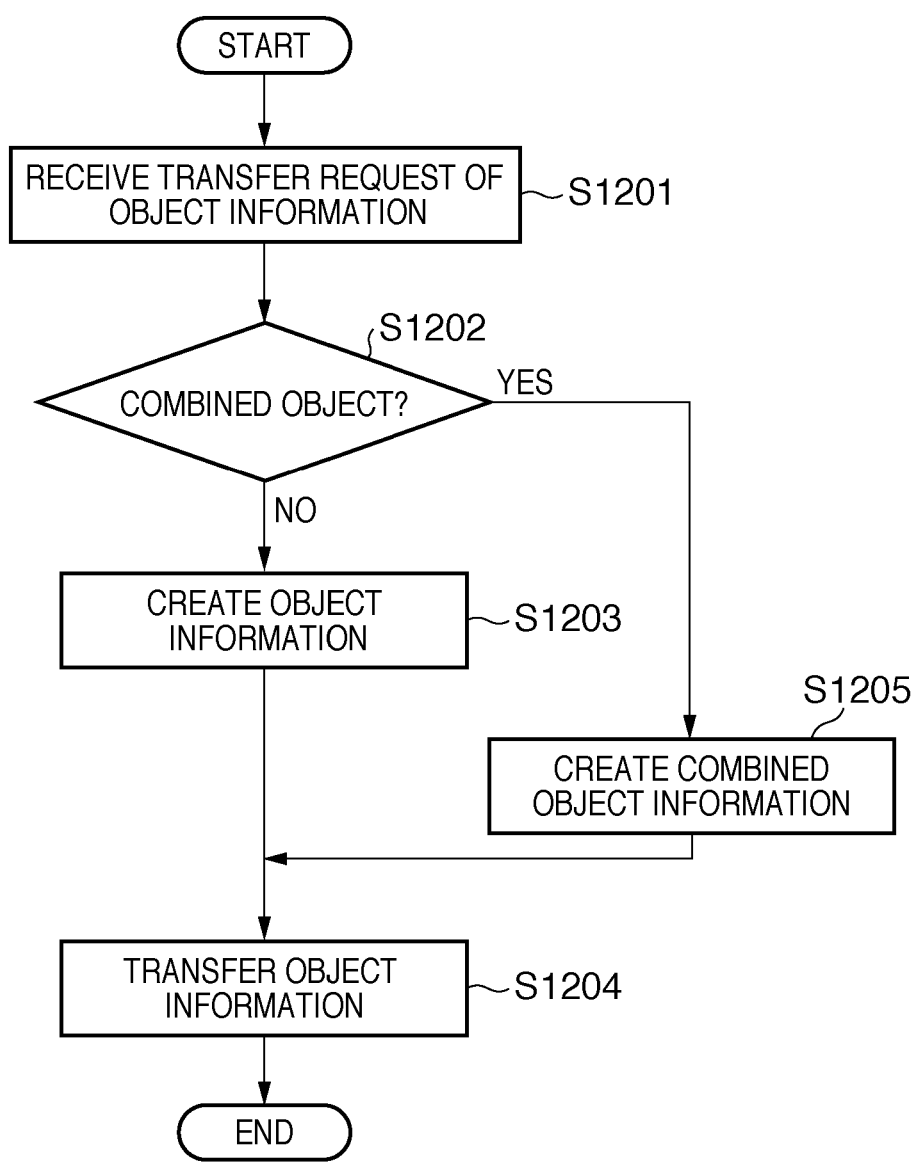
FIG. 12 is a flowchart illustrating combined object information transfer processing.

FIG. 12 is a flowchart illustrating an operation to obtain object information using the object list obtained from the image capturing apparatus 2.

In FIG. 12, the external control apparatus 1 sends a transfer request for object information corresponding to a desired object handle designated by the object list obtained from the image capturing apparatus 2.

When the image capturing apparatus 2 receives an object information transfer request from the external control apparatus 1 (S1201), the storage function control unit 48 determines whether the object represented by the designated object handle is a combined object in S1202.

In the case that it is not a combined object in S1202, in S1203, the image capturing apparatus 2 causes the storage function control unit 48 to read out the designated object, and generate object information represented by the object handle (S1203).

The object information generated in S1203 is sent to the external control apparatus 1 through the communication unit 38 in S1204.

On the other hand, in the case that it is determined in S1202 that it is not a combined object, the file combining unit 51 generates combined object information of an object handle representing the combined moving image file (S1205), and sends it to the external control apparatus 1 in S1204.

In the present embodiment, the external control apparatus 1 sends a transfer request for object information of 0x10000000, which is a combined object handle of AVI_0001.AVI and AVI_0002.AVI, and obtains the object information thereof from the image capturing apparatus 2.

The object information sent to the external control apparatus 1 is, for example, a file size in the case that AVI_0001.AVI and AVI_0002.AVI are combined and can be played back as a moving image file. The necessary memory size for transfer can be determined when the combined object is received in the external control apparatus 1.

Also, file data management after obtaining the combined object in the external control apparatus 1 becomes easy by using the object information sent to the external control apparatus 1 as the file name of the file that was recorded in the recording medium first.

Also, management by accurate created date and times of file becomes possible by using the object information sent to the external control apparatus 1 as the created date and time of file of AVI_0001.AVI, which is the file that was recorded in the recording medium first.

Figure 14:
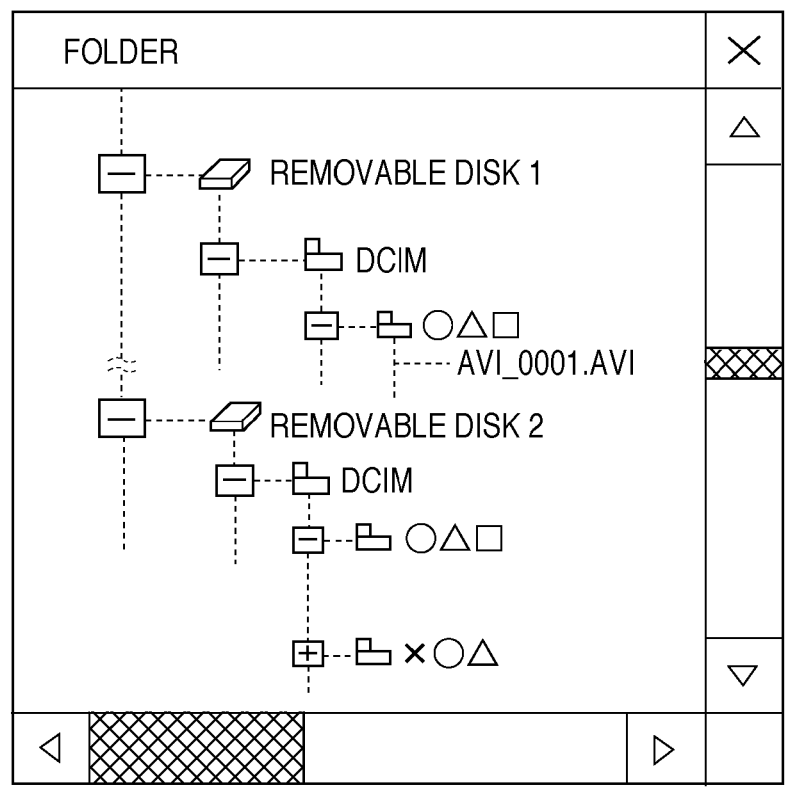
FIG. 14 is a diagram illustrating an example of a list display of combined object data.

In the external control apparatus 1, it is possible to display the object information recorded in the external recording media 22a, 22b in the image capturing apparatus 2 by file name or file size, created date and time of file, icon, etc., and present it to the user. For example, as shown in FIG. 14, the file AVI_0001.AVI is displayed on the display or the like of the external control apparatus 1.

Figure 13:
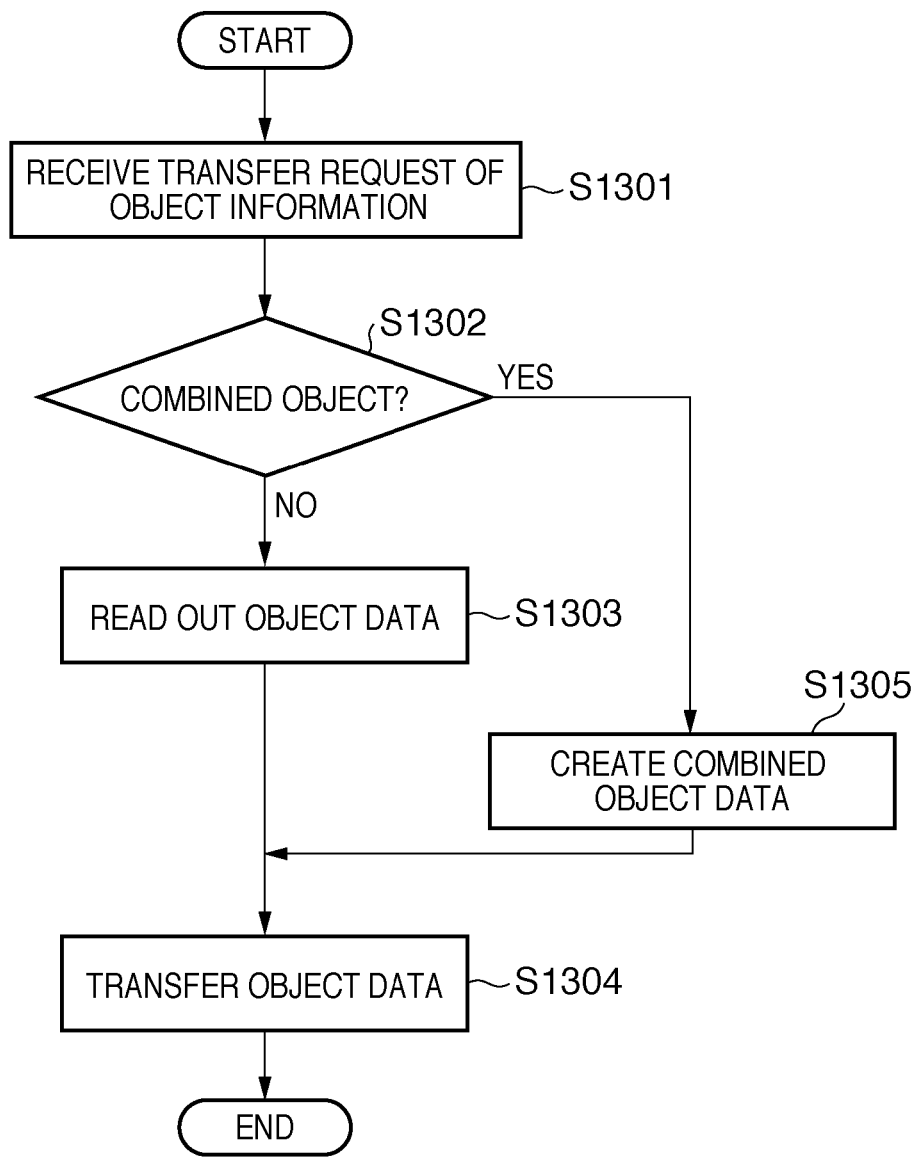
FIG. 13 is a flowchart illustrating combined object data transfer processing.

FIG. 13 is a flowchart illustrating an operation of obtaining object data from the image capturing apparatus 2.

The operation assumed here is, for example, an operation of a user dragging and dropping an icon representing object information displayed on the display or the like of the external control apparatus 1 onto a desktop.

When the aforementioned operation is executed, an object data transfer request representing an object handle is sent from the external control apparatus 1 to the image capturing apparatus 2 (S1301).

When the image capturing apparatus 2 receives the object data transfer request from the external control apparatus 1, the storage function control unit 48 determines whether the object representing the designated object handle is a combined object in S1302.

In the case that it is not a combined object in S1302, the designated object data is read out from the corresponding external recording media 22a, 22b (S1303), and the read out object data is sent to the external control apparatus 1 through the communication unit 38 (S1304).

On the other hand, in the case that it is determined that it is a combined object in S1302, the file combining unit 51 generates combined object data, which is a combination of the designated object data (S1305), and sends it to the external control apparatus 1 in S1304.

In the external control apparatus 1, the object data received from the image capturing apparatus 2 is recorded in an auxiliary storage apparatus such as a hard disk or the like of the external control apparatus 1.

In the present embodiment, the external control apparatus 1 designates 0x10000000, which is an object handle representing the combined object of AVI_0001. AVI and AVI_0002.AVI, and sends an object data transfer request.

By this, a single moving image file that is a combination of the two moving image files AVI_0001.AVI and AVI_0002.AVI is recorded in the external control apparatus 1.

The moving image file divided into two files and recorded in the image capturing apparatus 2 can be continuously played back as a single file in the external control apparatus 1.

In contrast to this, in the conventional technology, in the case that AVI_0001.AVI is played back, only the captured moving image data of AVI_0001.AVI can be played back, and AVI_0002.AVI cannot be continuously played back after AVI_0001.AVI.

<Data Deletion Processing>

Next, an operation to delete the combined object data obtained from the image capturing apparatus 2 from the external control apparatus 1 will be explained.

FIG. 15 is a flowchart illustrating processing to delete the combined object data obtained from the image capturing apparatus 2 from the external control apparatus 1.

In FIG. 15, when the user designates an arbitrary object and executes a deletion operation in a state in which an object list is displayed as a list in the external control apparatus 1, a command to delete the designated object data is sent to the image capturing apparatus 2.

When the image capturing apparatus 2 receives the command to delete the object data from the external control apparatus 1 (S1501), the storage function control unit 48 determines whether the designated object data is a combined object in S1502. In the case that it is a combined object, the process proceeds to S1503, and the storage function control unit 48 deletes the designated object data from the external recording media 22a, 22b.

On the other hand, in the case that it is determined in S1502 that it is not a combined object, the process proceeds to S1504, and the storage function control unit 48 deletes the plurality of object data that makes up the combined object from the external recording media 22a, 22b.

<Transfer Processing 2 of Data Divided and Stored in a Plurality of Recording Media>

Next, an operation to notify the external control apparatus 1 that a combined object is recorded in each of the external recording media 22a, 22b in the image capturing apparatus 2 will be explained with reference to the flow of FIG. 16.

Here, S1601 to S1604, S1607 in FIG. 16 are the same as S1101 to S1104, S1108 in FIG. 11, and an explanation thereof will be omitted.

In S1605 in FIG. 16, the storage function control unit 48 generates a combined object handle representing a combined moving image file, and adds the generated combined object handle to the object list (S1606). The storage function control unit 48 generates a combined object handle, which is a combination of AVI_0001.AVI and AVI_0002.AVI respectively recorded in the external recording media 22a and 22b. For example, an object handle 0x10000000 of a combined object in the external recording medium 22a and an object handle 0x20000000 of a combined object in the external recording medium 22b are sent to the external control apparatus 1.

By this, combined moving image files that are recorded in either of the external recording media 22a or 22b are displayed in the external control apparatus 1, as shown in FIG. 17. Therefore, it is possible for a user to easily find the storage location of a moving image file that is divided and recorded in a plurality of recording media.

Moreover, although the file size of still images has recently increased along with the increase in the resolution of image capturing elements, the present invention can also be applied to still images. In the case of application to a still image, the storage function control unit 48 divides and records the captured still image data in the external recording media 22a and 22b. The transfer processing to the external control apparatus 1 is the same as in the aforementioned embodiment.

[Other Embodiments]

Moreover, although a divided moving image file was combined when an object handle was generated in the aforementioned embodiment, the timing of combination is not limited to this. For example, object information can be sent to the external control apparatus 1 as if it were combined, without actually performing file combination in the processing of FIG. 11 and FIG. 12. File combination can then be executed in the case that an actual file request is received in S1301, etc. By this, because the file is first combined when the actual file is actually requested, there is no need for the image capturing apparatus to execute unnecessary combination processing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-278609, filed Oct. 29, 2008, which is hereby incorporated by reference herein in its entirety.

What is claimed is:

1. An image capturing apparatus which is connectable to and able to communicate with an external apparatus, comprising:

an image capturing unit which captures an object image and generates image data;

a recording unit which records image data generated by said image capturing unit in at least one recording medium as a first and second file; and a notifying unit which notifies said external apparatus of information of files recorded in at least one recording medium before the files are transmitted to said external apparatus;

a receiving unit which receives a data transfer request transmitted by said external apparatus for any one of information of the files which is notified by said notifying unit;

a transmitting unit which transmits file according to the data transfer request received by said receiving unit to said external apparatus, wherein said notifying unit notifies said external apparatus of information of the first file and second file as a single combined file information, said transmitting unit transmits the first file and second file to said external apparatus in the case that said receiving unit receives the data transfer request according to the combined file information, and wherein the first file and second file are not combined into a single file until at least said receiving unit receives the data transfer request according to the combined file information.

2. The apparatus according to claim 1, wherein the combined file information includes a file size that is the combined file size of the first and second files.

3. The apparatus according to claim 1, wherein the combined file information includes a file name that is one of the first and second files prior to the first and second files being combined, or the created date and time of the files prior to the first and second files being combined.

4. The apparatus according to claim 1, wherein in the case that the combined file information is deleted in said external apparatus, said recording unit deletes the first and second files.

5. The apparatus according to claim 1, wherein in the case that the first and second files are recorded in different recording media and information of the files recorded in each recording medium of said image capturing apparatus are displayed as a list in said external apparatus, such that a single file information is recorded in each recording medium in which the first and second files are recorded.

6. The apparatus according to claim 1, wherein said recording unit stores the first file in a first recording medium, and stores the second file in a second recording medium.

7. The apparatus according to claim 6, wherein said recording unit stores, as the second file, rest of the image data generated by said image capturing unit in the second recording medium when the capacity of the first recording medium is less than a predetermined value during processing to store, as the first file, the image data generated by said image capturing unit in the first recording medium.

8. The apparatus according to claim 1, wherein the image data generated by said image capturing unit is moving image data.

9. The apparatus according to claim 8, wherein processing to capture the moving image data by said image capturing unit and processing to record the moving image data in at least one recording medium by said recording unit are executed in parallel.

10. A control method for an image capturing apparatus comprising a communication unit which connects to and communicates with an external apparatus, and an image capturing unit which captures an object image and generates image data, comprising:
   a recording step of recording image data generated by said image capturing unit in at least one recording medium as a first file and second file; and
   a notifying step of notifying said external apparatus of information of files recorded in at least one recording medium before the files are transmitted to said external apparatus;
   a receiving step receiving a data transfer request transmitted by said external apparatus for any one of information of the files which is notified by said notifying step;
   a transmitting step of transmitting file according to the data transfer request received in said receiving step to said external apparatus,
   wherein said notifying step information of the first file and second file as a single combined file information is notified said external apparatus,
   in said transmitting step the first file and second file are transmitted to said external apparatus in the case that the data transfer request according to the combined file information is received in said receiving step, and
   wherein the first file and second file are not combined into a single file until at least the data transfer request according to the combined file information is received in said receiving step.

11. The method according to claim 10, wherein the combined file information includes a file size that is the combined file size of the first and second files.

12. The method according to claim 10, wherein the combined file information includes a file name that is one of the first and second files prior to the first and second files being combined, or the created date and time of the files prior to the first and second files being combined.

13. The method according to claim 10, wherein in the case that the combined file information is deleted in said external apparatus, the first and second files are deleted in said recording step.

14. The method according to claim 10, wherein in the case that the first and second files are recorded in different recording media and information of the files recorded in each recording medium of said image capturing apparatus are displayed as a list in said external apparatus, such that a single file information is recorded in each recording medium in which the first and second files are recorded.

15. A non-transitory computer-readable storage medium storing a program for causing a computer of the image capturing apparatus to execute the control method according to claim 10.

16. The method according to claim 10, wherein in said recording step, the first file is stored in a first recording medium and the second file is stored in a second recording medium.

17. The method according to claim 16, wherein in said recording step, unit stores, as the second file, rest of the image data generated by said image capturing unit is stored, as the second file, in the second recording medium when the capacity of the first recording medium is less than a predetermined value during processing to store, as the first file, the image data generated by said image capturing unit in the first recording medium.

18. The method according to claim 10, wherein the image data generated by said image capturing unit is moving image data.

19. The method according to claim 18, wherein processing to capture the moving image data by said image capturing unit and processing to record the moving image data in at least one recording medium in said recording step are executed in parallel.

20. A system in which an external apparatus and an image capturing apparatus are connectable and able to communicate with each other, wherein:
   said image capturing apparatus comprises:
      an image capturing unit which captures an object image and generates image data;
      a recording unit which records image data generated by said image capturing unit in at least one recording medium as a first and second file;
      a notifying unit which notifies said external apparatus of information of files recorded in at least one recording medium before the files are transmitted to said external apparatus;
      a receiving unit which receives a data transfer request transmitted by said external apparatus for any one of information of the files which is notified by said notifying unit; and
      a transmitting unit which transmits file according to the data transfer request received by said receiving unit to said external apparatus,
      wherein said notifying unit notifies said external apparatus of information of the first file and second file as a single combined file information,
      said transmitting unit transmits the first file and second file to said external apparatus in the case that said receiving unit receives the data transfer request according to the combined file information, and
      wherein the first file and second file are not combined into a single file until at least said receiving unit receives the data transfer request according to the combined file information; and
   said control apparatus comprises:
      a receiving unit which receives combined file information notified by said image capturing apparatus;
      a transmitting unit which transmits a data transfer request according to the combined file information received from said image capturing apparatus; and
      an obtaining unit which obtains file according to the data transfer request from said image capturing apparatus.

* * * * *